(12) United States Patent
Hong

(10) Patent No.: US 7,840,164 B2
(45) Date of Patent: Nov. 23, 2010

(54) SCANNING UNIT, MANUFACTURING METHOD THEREOF AND IMAGE FORMING APPARATUS

(75) Inventor: Jeong-seop Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 191 days.

(21) Appl. No.: 12/176,572

(22) Filed: Jul. 21, 2008

(65) Prior Publication Data

US 2009/0086008 A1    Apr. 2, 2009

(30) Foreign Application Priority Data

Sep. 28, 2007  (KR) .................. 10-2007-0098037

(51) Int. Cl.
*G03G 15/00* (2006.01)
*G03G 13/04* (2006.01)
*B41J 2/385* (2006.01)
*B41J 2/435* (2006.01)

(52) U.S. Cl. .................. 399/211; 347/138; 347/263
(58) Field of Classification Search .................. 399/206, 399/211; 347/37, 39, 138, 222, 225, 242, 347/245, 257, 263; 720/676
See application file for complete search history.

(56) References Cited

U.S. PATENT DOCUMENTS

| 4,377,337 | A | * | 3/1983 | Beck ........................ 399/211 |
| 5,101,223 | A | * | 3/1992 | Boeve .................. 347/263 X |
| 5,130,972 | A | * | 7/1992 | Mizuno et al. ......... 720/676 X |
| 5,875,376 | A | * | 2/1999 | Chou ...................... 399/211 |
| 6,435,757 | B1 | | 8/2002 | Casella |
| 6,836,633 | B2 | * | 12/2004 | Bannai et al. ............. 399/211 |

FOREIGN PATENT DOCUMENTS

| JP | 05-107433 | * | 4/1993 |
| JP | 11-300435 | | 11/1999 |

* cited by examiner

*Primary Examiner*—Sandra L Brase
(74) *Attorney, Agent, or Firm*—Stanzione & Kim, LLP

(57) ABSTRACT

An image forming apparatus including an image forming unit to form an image on a print medium, the image forming apparatus including a guide shaft, first and second shaft insertion members into which the guide shaft is inserted, a unit main body including first and second insertion holes provided along the guide shaft and whose diameters larger than external diameters of the first and second shaft insertion members, respectively, and an adhesive to adhere the first and second shaft insertion members inserted into the first and second insertion holes, to the unit main body.

16 Claims, 6 Drawing Sheets

SCANNING UNIT, MANUFACTURING METHOD THEREOF AND IMAGE FORMING APPARATUS

CROSS-REFERENCE TO RELATED APPLICATIONS

This application claims priority under 35 U.S.C 119(a) from Korean Patent Application No. 10-2007-0098037, filed on Sep. 28, 2007, in the Korean Intellectual Property Office, the disclosure of which is incorporated herein in its entirety by reference.

BACKGROUND OF THE INVENTION

1. Field of the Invention

The present general inventive concept relates to a scanning unit, a manufacturing method thereof and an image forming apparatus, and more particularly, to a scanning unit which minimizes vibration while reciprocating in a linear direction, a manufacturing method thereof and an image forming apparatus.

2. Description of the Related Art

A conventional scanning unit scans an image of documents. The scanning unit emits light to a predetermined position through a lighting module, and forms an image with the light reflected by the documents on an image sensor through an imaging lens, thereby scanning the image information formed in the predetermined position of the documents.

The scanning unit may be employed in an image forming apparatus to store the scanned image information as a file or to copy the scanned image information to a print medium. The image forming apparatus may include a multi-function device, a photocopier, a scanner, etc.

As illustrated in FIG. 1, a scanning unit may reciprocate in a main scanning direction X to scan an overall page of the document provided in a plate. The image forming apparatus includes a guide shaft which has a lengthwise direction as the main scanning direction to reciprocate the scanning unit. Two shaft insertion members are installed in the scanning unit to insert the guide shaft thereinto and move along the guide shaft.

If a gap between an external diameter of the guide shaft and an internal diameter of the shaft insertion members is increased, the scanning unit is vibrated, thereby lowering a quality of the scanned image information. A component tolerance (i.e., an allowable deviation from a predetermined standard) is strictly managed to prevent the quality of the image from being lowered and to minimize the gap therebetween.

However, even if the component tolerance is strictly managed, the two shaft insertion members may be easily distorted when installed. Thus, coaxial tolerance, i.e. alignment tolerance may occur. While the component tolerance is several micrometers, the alignment tolerance is generally 30 μm to 40 μm. Thus, the lowered image quality is mainly resulted from the alignment tolerance.

The alignment tolerance should be minimized if the two shaft insertion members are installed.

SUMMARY OF THE INVENTION

The present general inventive concept provides a scanning unit to minimize an alignment tolerance, a manufacturing method thereof and an image forming apparatus.

The present general inventive concept also provides a scanning unit to minimize a vibration when moving, a manufacturing method thereof and an image forming apparatus.

The present general inventive concept also provides a scanning unit to improve an image quality, a manufacturing method thereof and an image forming apparatus.

Additional aspects and utilities of the present general inventive concept will be set forth in part in the description which follows and, in part, will be obvious from the description, or may be learned by practice of the present general inventive concept.

The foregoing and/or other aspects and utilities of the present general inventive concept are achieved by providing an image forming apparatus which has an image forming unit forming an image on a print medium, the image forming apparatus comprising: a guide shaft; first and second shaft insertion members into which the guide shaft is inserted; a unit main body which has first and second insertion holes provided along the guide shaft and whose diameters larger than external diameters of the first and second shaft insertion members, respectively; and an adhesive which adheres the first and second shaft insertion members inserted into the first and second insertion holes, to the unit main body.

The adhesive may adhere the first and second shaft insertion members in a substantially equivalent center with respect to the guide shaft.

The unit main body may further comprise an adhesive injected part through which a part of an external circumference of at least one of the first and second shaft insertion members is exposed to the outside for the adhesive to be injected between the external circumference of at least one of the first and second shaft insertion members, and at least corresponding one of the first and second insertion holes.

The foregoing and/or other aspects and utilities of the present general inventive concept can also be achieved by providing a scanning unit, comprising a light source to emit light, a sensor to scan image information of a document with light reflected from the document; a guide shaft, first and second shaft insertion members into which the guide shaft is inserted, a unit main body to support the light source and the sensor, and has first and second insertion holes provided along the guide shaft and whose diameters larger than external diameters of the first and second shaft insertion members, respectively, and an adhesive to adhere the first and second shaft insertion members installed in the first and second insertion holes, to the unit main body.

The unit main body may further comprise an adhesive injected part through which a part of an external surface of at least one of the first and second shaft insertion members is exposed to the outside for the adhesive to be injected between the external surface of at least one of the first and the second shaft insertion members, and at least corresponding one of the first and second insertion holes.

The first and second shaft insertion members may be aligned by a jig shaft corresponding to the guide shaft to be coaxial.

The foregoing and/or other aspects and utilities of the present general inventive concept can also be achieved by providing a manufacturing method of a scanning unit which has a unit main body moving along a guide shaft and first and second shaft insertion members installed in the unit main body and inserting the guide shaft therethrough, the manufacturing method comprising providing first and second insertion holes whose diameters larger than external diameters of the first and second shaft insertion members, respectively, in the unit main body along the guide shaft, installing the first and second shaft insertion members in the first and second insertion holes with a jig to be coaxial, and applying an adhesive to a gap between an external surface of at least one on the first and second shaft insertion members, and at least corresponding one of the first and second insertion holes.

The manufacturing method may further comprise emitting light to cure the adhesive.

The jig may comprise a jig shaft corresponding to the guide shaft, and the installing the first and second shaft insertion members may comprise inserting the first and second shaft insertion members to the jig shaft, and inserting the jig shaft into the first and second insertion holes to insert the first and second shaft insertion members to the first and second insertion holes.

The manufacturing method may further comprise providing an adhesive injected part in the unit main body to expose a part of an external surface of at least one of the first and second shaft insertion members to the outside for the adhesive to be injected into the gap.

The foregoing and/or other aspects and utilities of the present general inventive concept can also be achieved by providing an image forming apparatus, comprising a unit main body comprising a plurality of aligned insertion holes, a plurality of shaft insertion members to be fixed within the plurality of aligned insertion holes, and a guide shaft to be inserted through the plurality of shaft insertion members to guide the unit main body along a length thereof in a scanning direction.

The plurality of aligned insertion holes may have equal diameters.

An adhesive may be applied to an external surface of each of the plurality of shaft insertion members to fix the plurality of shaft insertion members within the plurality of aligned insertion holes.

A gap may exist between an external surface of each of the plurality of shaft insertion members and the plurality of aligned insertion holes to allow adhesive to be injected therebetween.

The unit main body may further comprise a plurality of adhesive injected parts to allow an adhesive to be injected through the unit main body onto an external surface of each of the plurality of shaft insertion members to fix the plurality of shaft insertion members within the plurality of aligned insertion holes.

The adhesive injected parts may each comprise an adhesive injection groove formed in a circumferential direction of each of the plurality of aligned insertion holes to correspond thereto and to allow the external surfaces of the plurality of shaft insertion members to be exposed to the outside The image forming apparatus may further comprise a jig shaft to install the plurality of shaft insertion members within the plurality of aligned insertion holes, such that the plurality of shaft insertion members are aligned.

The jig shaft may be removed after installation of the plurality of shaft insertion members.

The foregoing and/or other aspects and utilities of the present general inventive concept can also be achieved by providing a manufacturing method of an image forming apparatus including a unit main body, the manufacturing method comprising providing a plurality of aligned insertion holes within the main unit body, fixing a plurality of shaft insertion members within the plurality of aligned insertion holes, and inserting a guide shaft through the plurality of shaft insertion members to guide the unit main body along a length thereof in a scanning direction.

The manufacturing method may further comprise applying an adhesive to an external surface of each of the plurality of shaft insertion members to fix the plurality of shaft insertion members within the plurality of aligned insertion holes.

The manufacturing method may further comprise providing an adhesive injected part to allow an adhesive to be injected through the unit main body onto an external surface of each of the plurality of shaft insertion members to fix the plurality of shaft insertion members within the plurality of aligned insertion holes.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
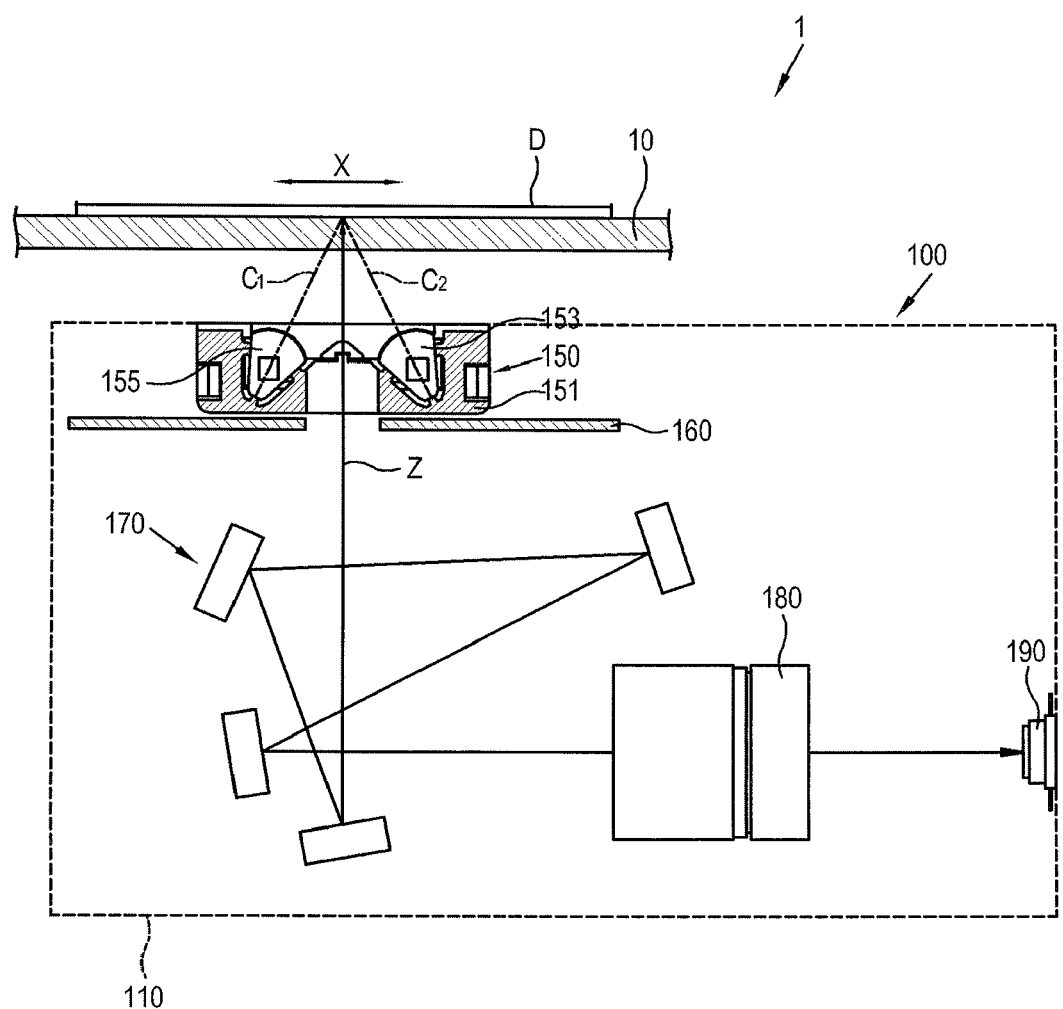
FIG. 1 is a schematic view of an image forming apparatus according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
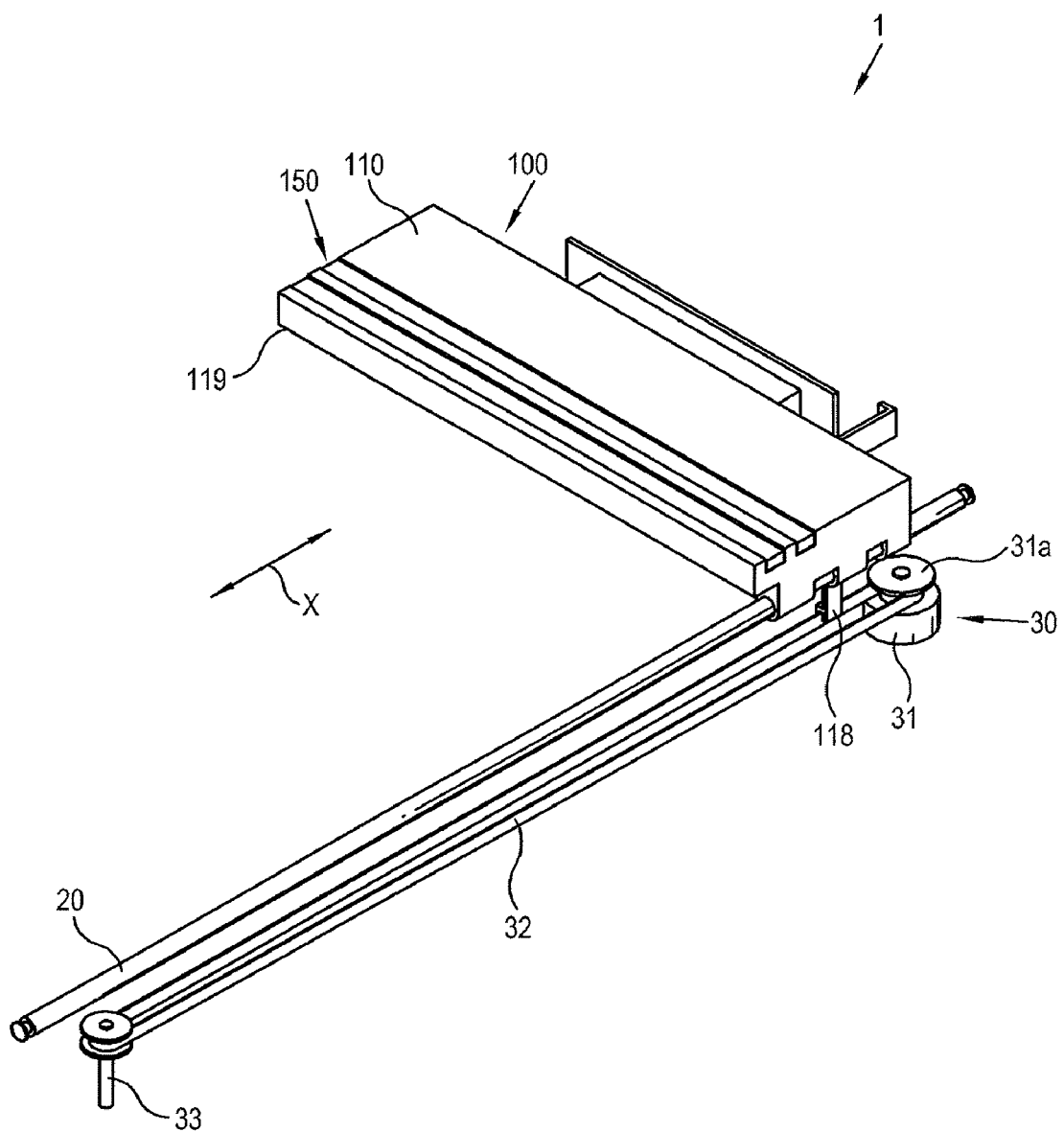
FIG. 2 is a perspective view of the image forming apparatus in FIG. 1.

As illustrated in FIGS. 1 and 2, an image forming apparatus 1 according to an embodiment of the present general inventive concept includes a plate 10 on which a document D is placed, a guide shaft 20 which has a lengthwise direction as a main scanning direction X, and a scanning unit 100 which reciprocates along the guide shaft 20 to scan an image of the document D.

The guide shaft 20 may be elongated in a linear direction of the main scanning direction X. In other words, the guide shaft 20 may be parallel to the main scanning direction X.

Figure 3:
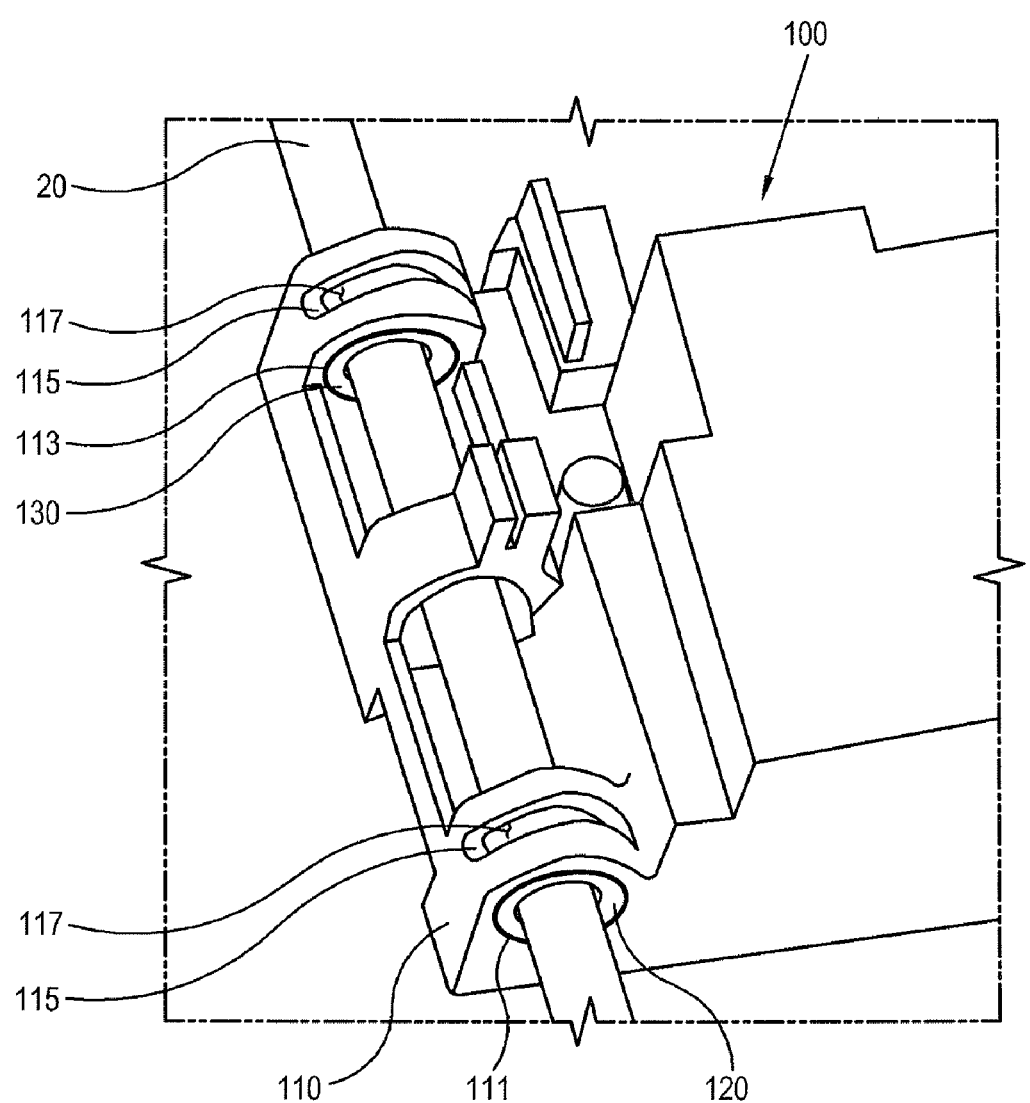
FIG. 3 is a rear perspective view of a scanning unit in FIG. 2.
Figure 4:
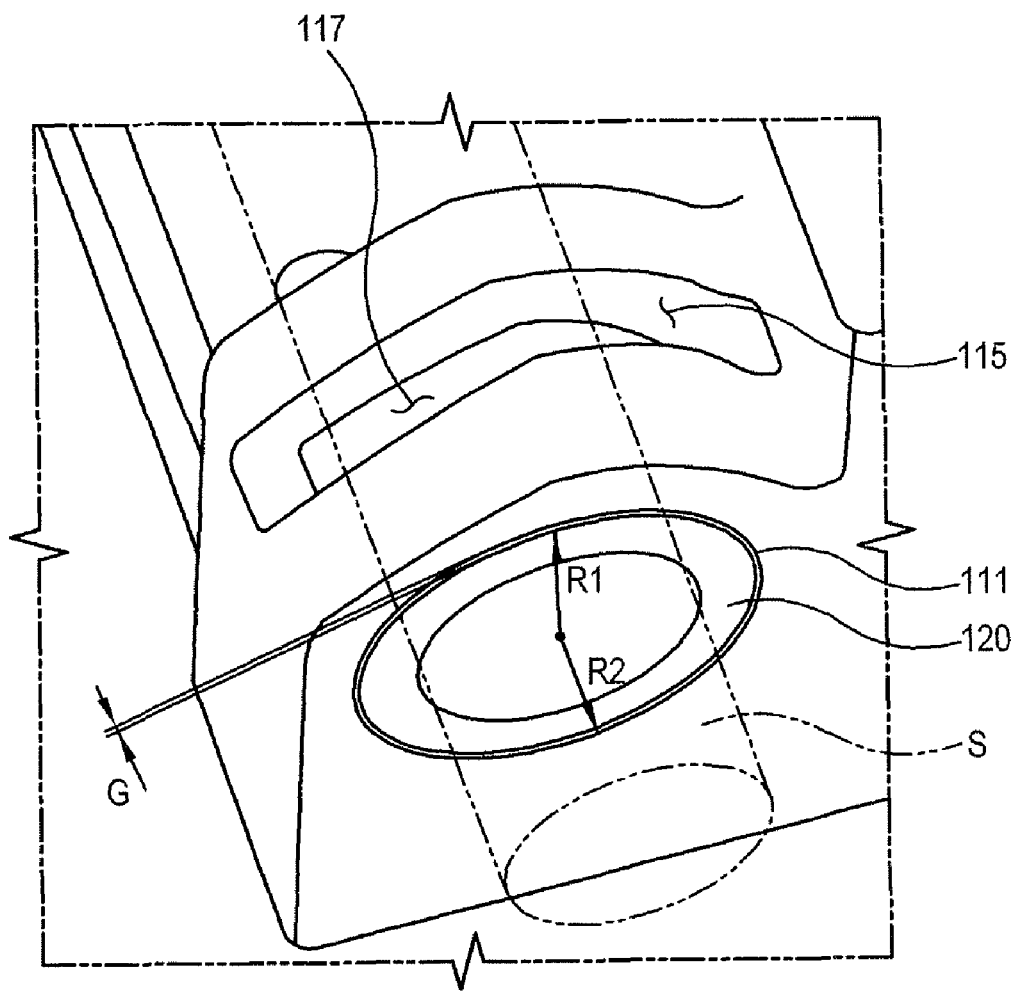
FIG. 4 is an enlarged view of the scanning unit in FIG. 3.
Figure 5:
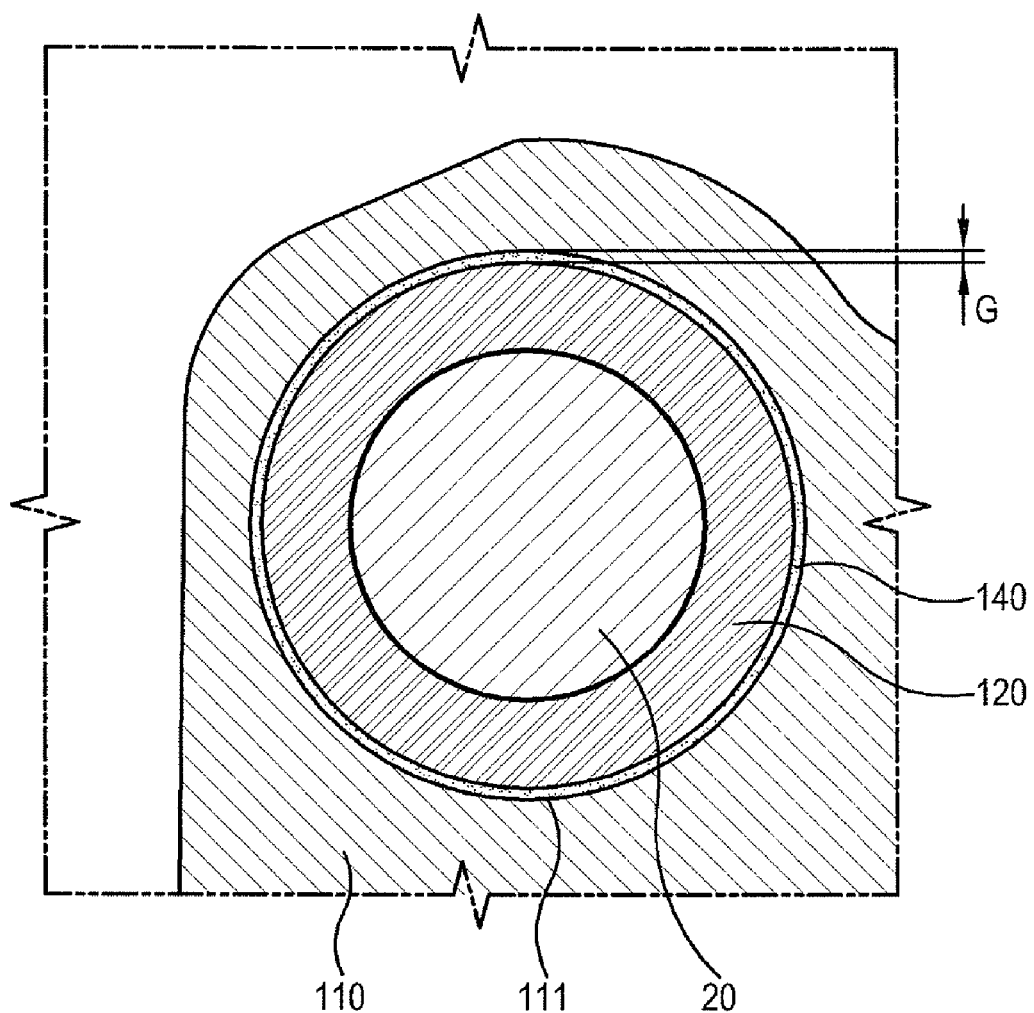
FIG. 5 is a sectional view of the scanning unit in FIG. 3.

As illustrated in FIGS. 3 to 5, the scanning unit 100 includes a unit main body 110, first and second shaft insertion members 120 and 130, and an adhesive 140.

As illustrated in FIGS. 1 and 2, the unit main body 110 supports a lighting module 150, a reflection mirror 170, an imaging lens 180 and a sensor 190. The unit main body 110 may reciprocate in the main scanning direction X. More specifically, first and second insertion holes 111 and 113, which will be described later with reference to FIG. 3, are formed in a first side of the unit main body 110 to be supported by the guide shaft 20. A second side 119 of the unit main body 110 is supported by a rail (not illustrated) to reciprocate the unit main body 110.

As illustrated in FIG. 3, the unit main body 110 includes the first and second insertion holes 111 and 113 to insert the first and second shaft insertion members 120 and 130 thereinto, respectively.

As illustrated in FIG. 4, a radius R2 of the first and second insertion holes 111 and 113 is larger than an external radius R1 of the first and second shaft insertion members 120 and 130 as much as a gap G. The gap G is filled with the adhesive 140 (to be described later) and is provided to adjust an alignment of the first and second shaft insertion members 120 and 130.

The unit main body 110 may further include an adhesive injected part 115 through which a part of an external surface of at least one of the first and second shaft insertion members 120 and 130 is exposed to the outside to inject the adhesive 140 to the gap G without difficulty.

As illustrated in FIG. 3, the adhesive injected part 115 may include an adhesive injection groove 117 which is formed in a circumferential direction of the first and second insertion holes 111 and 113.

As illustrated in FIG. 3, the first and second shaft insertion members 120 and 130 have an internal space to insert the guide shaft 20 thereinto, and may include shaft bushings. The first and second shaft insertion members 120 and 130 may include bearings as necessary.

As illustrated in FIG. 4, the first and second shaft insertion members 120 and 130 are inserted into the first and second insertion holes 111 and 113 via a jig provided to install the shaft insertion members 120 and 130.

The shaft insertion member-installing jig includes a jig shaft S. A tolerance of the jig shaft S may be more strictly managed such that an external diameter tolerance of the jig shaft S is smaller than that of the guide shaft 20. In other words, the jig shaft S is provided to have a uniform external diameter tolerance throughout its length. Since the external diameter tolerance of the jig shaft S affects the alignment tolerance (coaxial tolerance) of the first and second shaft insertion members 120 and 130, it is important that the external diameter tolerance of the jig shaft S is uniform throughout its length.

If the external diameter of the jig shaft S is exactly equivalent to an internal diameter of the shaft insertion members 120 and 130, the alignment tolerance of the first and second shaft insertion members 120 and 130 may be zero. However, it is almost impossible to make the external diameter of the jig shaft S and the internal diameter of the shaft insertion members 120 and 130 exactly equivalent to each other. Thus, the respective tolerances are strictly managed to make the external diameter of the jig shaft S and the internal diameter of the shaft insertion members 120 and 130 substantially equivalent to each other. Thus, the alignment tolerance of the first and second shaft insertion members 120 and 130 may be minimized.

The external diameter of the guide shaft 20 may be smaller than a minimum external diameter of the jig shaft S so that the unit main body 220 efficiently reciprocates along the guide shaft 20. That is, the external diameter of the guide shaft 20 is smaller than that of the jig shaft S.

The jig shaft S is inserted into the first and second shaft insertion members 120 and 130, and then the jig shaft S having the first and second shaft insertion members 120 and 130 thereon is inserted into the first and second insertion holes 111 and 113 of the unit main body 110.

The first and second shaft insertion members 120 and 130 are placed in the first and second insertion holes 111 and 113 to complete the alignment of the first and second shaft insertion members 120 and 130. As the jig shaft S whose tolerance is strictly managed is inserted into the first and second shaft insertion members 120 and 130, the alignment tolerance therebetween is minimized. Accordingly, the gap G between the external circumference of the guide shaft 20 and the internal circumference of the first and second shaft insertion members 120 and 130 caused by the alignment tolerance may be minimized. Vibrations generated during the reciprocation of the scanning unit 100 are reduced and a scanned image quality of the document D improves.

Meanwhile, the adhesive 140 is injected through the adhesive injection groove 117 to adhere the first and second shaft insertion members 120 and 130 to the unit main body 110 while the first and second shaft insertion members 120 and 130 are aligned.

The adhesive 140 may include an instant adhesive or an UV (ultraviolet) adhesive. A hardener may be additionally used to facilitate curing (i.e., hardening to form a bond). If the adhesive 140 includes a UV adhesive, the adhesive 140 may be applied to the external circumference of the first and second shaft insertion members 120 and 130 before the jig shaft S having the first and second shaft insertion members 120 and 130 thereupon is inserted into the unit main body 110. After the first and second shaft insertion members 120 and 130 are aligned, UV light may be emitted to the applied adhesive 140 to cure the adhesive 140. Then, the aligned first and second shaft insertion members 120 and 130 may be adhered to the unit main body 110.

As illustrated in FIG. 1, the scanning unit 100 according to an embodiment of the present general inventive concept may further include the lighting module 150, the reflection mirror 170, the imaging lens 180 and the sensor 190, which are supported by the unit main body 110 and emit light to the document D.

The lighting module 150 may include a light source (not illustrated) having LED (light emitting diode), a plurality of light guiding members 153 and 155 and a module main body 151 to support the light source and the light guiding members 153 and 155. The light guiding members 153 and 155 change a path of light emitted by the light source and emit light to an image scanning area on the plate 10. The plurality of light guiding members 153 and 155 is installed in the module main body 151 so that central lines C1 and C2 of light emitted by the light guiding members 153 and 155 are inclined to a central optical axis Z. The lighting module 150 is not limited to that described above, and may vary including known light modules.

The imaging lens 180 is disposed between the plate 10 and the sensor 190 to form an image on the sensor 190 with light reflected from the document D.

The sensor 190 scans information of the document D with the light from the image lens 180. The sensor 190 may include image sensors having a plurality of rows to scan red/green/blue color images or red/green/blue/black and white color images.

The plurality of reflection mirrors 170 may be provided between the plate 10 and the imaging lens 180. The plurality of reflection mirrors 170 is provided to secure an optical path in a predetermined space, and reflects light reflected from the document D to change the optical path. If the plurality of the reflection mirrors 170 is provided, the optical distance between the document D and the sensor 190 is secured to form an image and the scanning unit 100 may be compact. The plurality of reflection mirrors 170 includes four sheets of mirrors, but not limited thereto. Alternatively, the reflection mirrors 170 may vary.

The scanning unit 100 according to an embodiment of the present general inventive concept may further include a light window 160 to control light directed to the sensor 190. The light window 160 is disposed between the lighting module 150 and the plurality of reflection mirrors 170, and block unnecessary light among those reflected from the document D.

The image forming apparatus 1 according to and embodiment of the present general inventive concept may further include a unit driver 30 to drive the scanning unit 100 to reciprocate the scanning unit 100 in the main scanning direction X.

The unit driver 30 includes a driving motor 31, a belt 32 and a pulley 33.

The belt 32 surrounds a driving pulley 31a and a driven pulley 33 of the driving motor 31 which are spaced from each other in the main scanning direction X. The unit main body 110 includes a clamper 118 to clamp the belt 32, and is driven by the belt 32.

The image forming apparatus 1 according to an embodiment of the present general inventive concept may include at least one of a file forming unit (not illustrated) to generate an image file from the image generated by the sensor 190 of the scanning unit 100, and an image forming unit (not illustrated) to form an image on a print medium with the generated image. If the image forming apparatus 1 includes the file forming unit only, it is an image scanning apparatus such as a scanner. If the image forming apparatus 1 includes the image forming unit only, it is an image forming apparatus such as a photocopier. If the image forming apparatus 1 includes both the file forming unit and the image forming unit, it is a multi function printer (MFP).

The image forming unit may include various known methods such as an inkjet type having a printing head including a plurality of nozzles to discharge ink therethrough, an electrophotographic type to form an image with a toner through charging-exposing-developing-transferring-fusing processes, and a thermal transfer type using an ink ribbon, but is not limited thereto.

Figure 6:
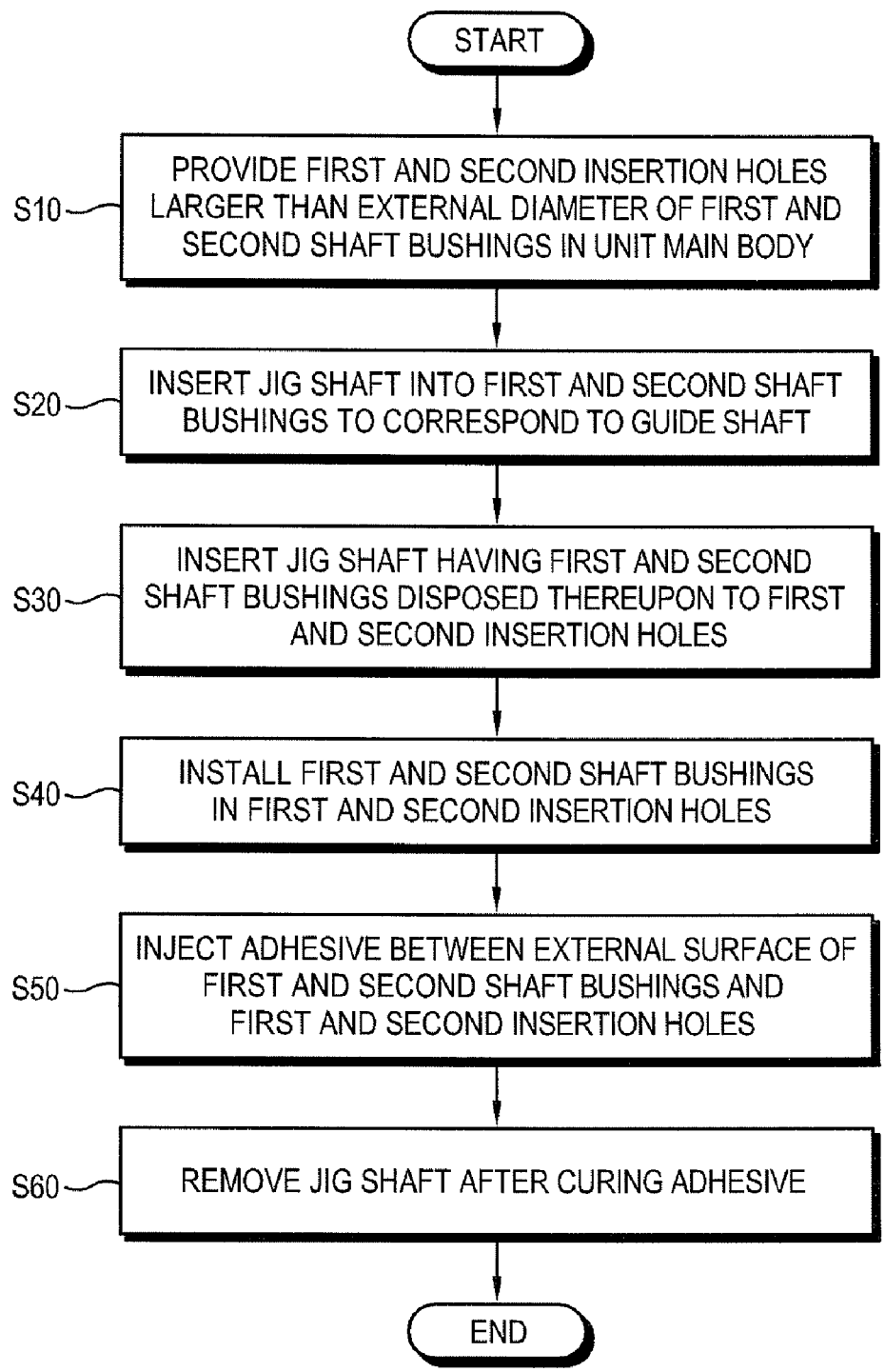
FIG. 6 is a flowchart of a scanning unit manufacturing method according to an embodiment of the present general inventive concept.

Hereinafter, a scanning unit manufacturing method according to an embodiment of the present general inventive concept will be described with reference to FIG. 6. The description will focus on the method of installing the first and second shaft insertion members 120 and 130 in the unit main body 110. The first and second shaft insertion members 120 and 130 will be referred to hereinafter as first and second bushings 120 and 130.

First, the first and second insertion holes 111 and 113 whose diameters are larger than the external diameters of the first and second bushings 120 and 130, respectively, are provided in the unit main body 110 in operation S10. In operation S20, the jig shaft S corresponding to the guide shaft 20 is inserted into first and second shaft bushings 120 and 130.

The jig shaft S having the first and second shaft bushings 120 and 130 disposed thereupon is inserted into the first and second insertion holes 111 and 113 in operation S30. Conversely, the unit main body 110 may be slid onto the jig shaft S having the first and second shaft bushings 120 and 130 disposed thereupon.

Then, the first and second shaft bushings 120 and 130 are disposed in the first and second insertion holes 111 and 113 in operation S40. The first and second shaft bushings 120 and 130 may be disposed in the first and second insertion holes 111 and 113 while aligned in a common center. If the jig shaft S includes a position fixer to fix the position of the first and second shaft bushings 120 and 130 corresponding to the first and second insertion holes 111 and 113, operation S40 of disposing the first and second shaft insertion members 120 and 130 may be omitted.

The adhesive 140 is injected between the external circumference of the first and second shaft bushings 120 and 130, and the first and second insertion holes 111 and 113 to adhere the first and second shaft bushings 120 and 130 aligned in the common center to the unit main body 110 in operation S50.

The adhesive 140 may include an instant adhesive or a UV adhesive. If the adhesive 140 includes a UV adhesive, UV light is emitted to cure the adhesive 140 after the adhesive 140 is injected.

The jig shaft S is removed after the adhesive 140 is cured in operation S60 and the first and second shaft bushings 120 and 130 are adhered to the unit main body 110.

The scanning unit manufacturing method may further include an operation of installing the lighting module 150, the reflection mirrors 170, the imaging lens 180 and the sensor 190, to the unit main body 110.

The method of installing the two shaft insertion members (shaft bushings) to the unit main body 110 has been described to minimize the alignment tolerance, with an example of the scanning unit 100. The present general inventive concept may be applicable to installing three or more shaft insertion members to a unit main body.

The present general inventive concept may be applicable to installing a plurality of shaft insertion members to a moving unit to move along a predetermined shaft in an image forming apparatus. For example, if the moving unit includes an ink cartridge of an inkjet printer, the present general inventive concept may be applicable to installing a plurality of shaft insertion members to the ink cartridge while minimizing an alignment tolerance.

As described above, a scanning unit, a manufacturing method thereof and an image forming apparatus have following effects.

First, an alignment tolerance which occurs during an installation of a plurality of shaft insertion members may be minimized.

Second, a vibration of a scanning unit (moving unit) may be minimized while moving.

Third, quality of an image which is generated by scanning image information of a document may improve.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus including an image forming unit to form an image on a print medium, the image forming apparatus comprising:
   a guide shaft;
   first and second shaft insertion members into which the guide shaft is inserted;
   a unit main body including first and second insertion holes provided along the guide shaft, in which the first and the second shaft insertion members are inserted into, respectively; and
   an adhesive to adhere the first and second shaft insertion members inserted into the first and second insertion holes, to the unit main body,
   wherein at least one of the first and the second insertion holes is larger than an external radius of corresponding one of the first and the second shaft insertion members as much as a gap in which the adhesive is filled, and the gap is provided to adjust an alignment of the first and the second shaft insertion members.

2. The image forming apparatus according to claim 1, wherein the adhesive adheres the first and second shaft insertion members in a substantially equivalent center with respect to the guide shaft.

3. The image forming apparatus according to claim 1, wherein the unit main body further comprises:

an adhesive injected part through which a part of an external circumference of at least one of the first and second shaft insertion members is exposed to the outside to inject the adhesive between the external circumference of at least one of the first and second shaft insertion members, and at least corresponding one of the first and second insertion holes.

4. A scanning unit, comprising:
a light source to emit light;
a sensor to scan image information of a document with light reflected from the document;
a guide shaft;
first and second shaft insertion members into which the guide shaft is inserted;
a unit main body to support the light source and the sensor, and has first and second insertion holes provided along the guide shaft, in which the first and the second shaft insertion members are inserted into, respectively; and
an adhesive to adhere the first and second shaft insertion members installed in the first and second insertion holes, to the unit main body,
wherein at least one of the first and the second insertion holes is larger than an external radius of corresponding one of the first and the second shaft insertion members as much as a gap in which the adhesive is filled, and the gap is provided to adjust an alignment of the first and the second shaft insertion members.

5. The scanning unit according to claim 4, wherein the unit main body further comprises:
an adhesive injected part through which a part of an external surface of at least one of the first and second shaft insertion members is exposed to the outside to inject the adhesive between the external surface of at least one of the first and the second shaft insertion members, and at least corresponding one of the first and second insertion holes.

6. The scanning unit according to claim 4, wherein the first and second shaft insertion members are aligned by a jig shaft corresponding to the guide shaft to be coaxial.

7. A manufacturing method of a scanning unit including a unit main body to move along a guide shaft and first and second shaft insertion members installed in the unit main body and to insert the guide shaft therethrough, the manufacturing method comprising:
providing first and second insertion holes in which the first and the second shaft insertion members are inserted into, respectively, in the unit main body along the guide shaft;
installing the first and second shaft insertion members in the first and second insertion holes with a jig to be coaxial; and
applying an adhesive to a gap between an external surface of at least one on the first and second shaft insertion members, and at least corresponding one of the first and second insertion holes,
wherein at least one of the first and the second insertion holes is larger than an external radius of corresponding one of the first and the second shaft insertion members as much as the gap in which the adhesive is filled, and the gap is provided to adjust an alignment of the first and the second shaft insertion members.

8. The manufacturing method according to claim 7, further comprising emitting light to cure the adhesive.

9. The manufacturing method according to claim 7, wherein:
the jig comprises a jig shaft corresponding to the guide shaft; and
the installing the first and second shaft insertion members comprises inserting the first and second shaft insertion members to the jig shaft, and inserting the jig shaft into the first and second insertion holes to insert the first and second shaft insertion members to the first and second insertion holes.

10. The manufacturing method according to claim 9, further comprising:
providing an adhesive injected part in the unit main body to expose a part of an external surface of at least one of the first and second shaft insertion members to the outside to inject the adhesive into the gap.

11. An image forming apparatus, comprising:
a unit main body comprising a plurality of aligned insertion holes;
a plurality of shaft insertion members to be fixed within the plurality of aligned insertion holes, respectively; and
a guide shaft to be inserted through the plurality of shaft insertion members to guide the unit main body along a length thereof in a scanning direction,
wherein a first and a second insertion holes of the plurality of aligned insertion holes are larger than an external radius of corresponding one of the plurality of shaft insertion members as much as a gap in which an adhesive is filled, and the gap is provided to adjust an alignment of the first and the second shaft insertion members.

12. The image forming apparatus of claim 11, wherein the plurality of aligned insertion holes have equal diameters.

13. The image forming apparatus of claim 11, wherein an adhesive is applied to an external surface of each of the plurality of shaft insertion members to fix the plurality of shaft insertion members within the plurality of aligned insertion holes.

14. The image forming apparatus of claim 11, wherein a gap exists between an external surface of each of the plurality of shaft insertion members and the plurality of aligned insertion holes to allow adhesive to be injected therebetween.

15. The image forming apparatus of claim 11, wherein the unit main body further comprises:
a plurality of adhesive injected parts to allow an adhesive to be injected through the unit main body onto an external surface of each of the plurality of shaft insertion members to fix the plurality of shaft insertion members within the plurality of aligned insertion holes.

16. The image forming apparatus of claim 15, wherein the adhesive injected parts each comprise:
an adhesive injection groove formed in a circumferential direction of each of the plurality of aligned insertion holes to correspond thereto and to allow the external surfaces of the plurality of shaft insertion members to be exposed to the outside.

* * * * *